July 3, 1951  W. H. WANNAMAKER, JR  2,559,266
OSCILLATOR CONTROLLED RELAY SYSTEM Original Filed June 22, 1944  2 Sheets-Sheet 1

*INVENTOR.*
WILLIAM H. WANNAMAKER JR.
BY Arthur H. Swanson
ATTORNEY.

July 3, 1951  W. H. WANNAMAKER, JR  2,559,266
OSCILLATOR CONTROLLED RELAY SYSTEM
Original Filed June 22, 1944  2 Sheets-Sheet 2
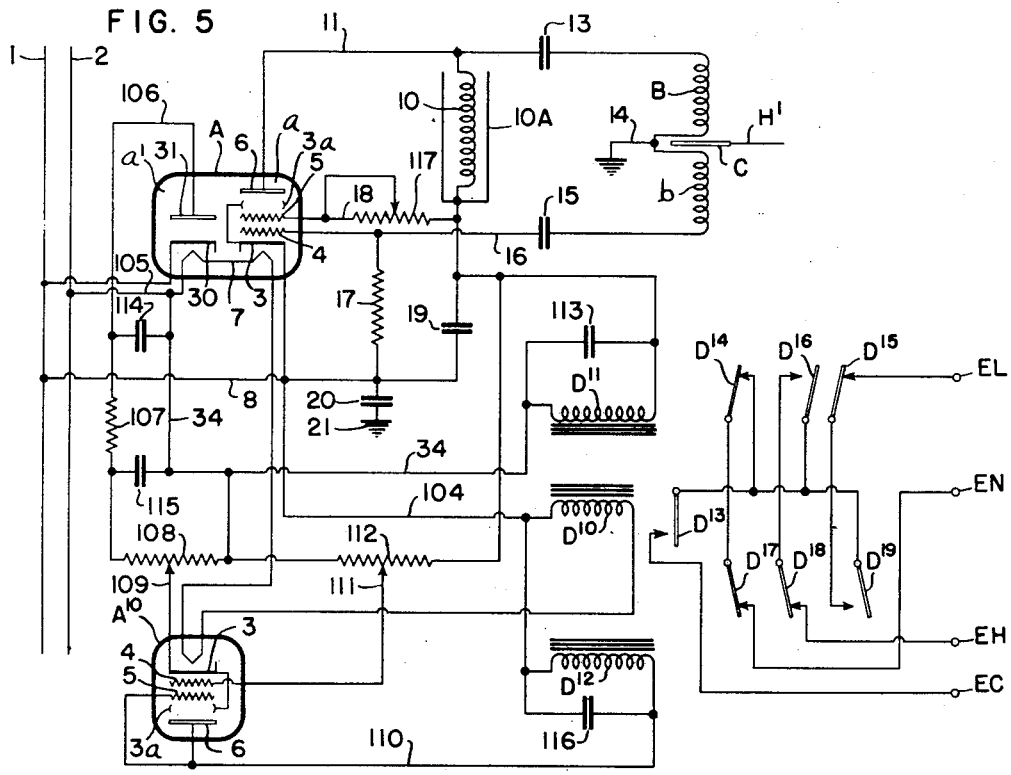
INVENTOR.
WILLIAM H. WANNAMAKER JR.
BY Arthur H. Swanson
ATTORNEY.

Patented July 3, 1951

2,559,266

UNITED STATES PATENT OFFICE 2,559,266

OSCILLATOR CONTROLLED RELAY SYSTEM

William H. Wannamaker, Jr., Flourtown, Pa., assignor to Minneapolis-Honeywell Regulator Company, Minneapolis, Minn., a corporation of Delaware Original application June 22, 1944, Serial No. 541,575. Divided and this application July 9, 1949, Serial No. 103,842

9 Claims. (Cl. 175—320)

A primary object of the present invention is to provide an improved control system of the type in which control actions are effected through an electronic tube and associated means by which said tube is adapted to operate as an oscillator, or not so to operate, accordingly as a controlling quantity or condition has one or another value. Such controlling quantity or condition may be a temperature, pressure, velocity, weight or other condition adapted to give movement to a control element on a small change in the value of the controlling quantity or condition.

This application is a division of my prior application Serial No. 541,575, filed June 22, 1944, for control apparatus, which issued as Patent No. 2,531,313, on November 21, 1950, and relates specifically to those forms of the invention disclosed in said prior application in which three position control is obtained with apparatus including one electronic valve adapted to operate as an oscillator, or not so to operate, accordingly as an inductive reactance included in the apparatus is varied by the adjustment of a control element in predetermined response to variations in the controlling quantity or condition, and also including one or two other electronic valves.

The various features of novelty which characterize the invention claimed herein are pointed out with particularity in the claims annexed to and forming a part of this specification. For a better understanding of the invention, however, its advantages, and specific objects attained by its use, reference should be had to the accompanying drawings and descriptive matter in which I have illustrated and described preferred embodiments of the invention.

Of the drawings:

Figs. 5 and 6 are diagrams illustrating different modifications of the three position control system shown in Fig. 1.

Figure 1:
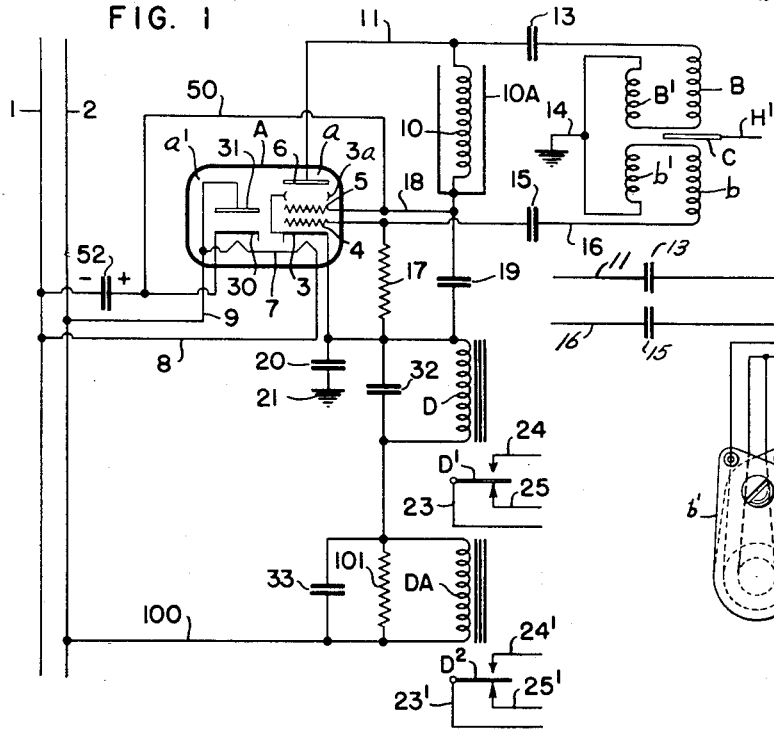
Fig. 1 is a diagram showing a circuit arrangement adapted for use in a three position control system.

In Fig. 1, I have diagrammatically illustrated a simple embodiment of my invention comprising an electronic tube A which does or does not operate as an oscillator, depending on the mutual inductance of suitably disposed inductance coils B, b, B' and b'. The mutual inductance of said coils depends upon the position of an inductance shield or vane C movable into and out of a position in which it is directly interposed between the coils. The shield or vane C is formed of sheet metal such as aluminum, copper or brass of good electrical conductivity, and changes in its position relative to the coils B, b, B' and b' vary their mutual inductance in a known manner. The shield or vane C is shown as carried by an arm H' which may be the deflecting element of a millivoltmeter, not shown, which deflects in response to variations in the voltage of a thermocouple as the temperature of the latter varies, or which deflects in response to the deflection of some other control instrument of device.

The electronic tube A shown in Fig. 1 is a rectifier-beam power amplifier tube of the type and form commonly known as the 117N7—GT tube, and comprises a tetrode valve or section $a$ and a diode valve or section $a'$. The use of that particular tube is not essential to the practice of the present invention. I consider it desirable, if not essential, however, to employ a tube enclosing a tetrode or other multi-grid electronic valve $a$ having a screen grid as well as a control grid. The screen grid acts as a shield between the anode and control grid elements of the valve $a$ for decreasing the capacitance between those elements, so that the tendency of the valve to oscillate due to inherent control grid to anode capacitance is eliminated or at least minimized. As a result, starting and stopping of the oscillations of the valve $a$ are determined solely by the relative positions of the vane C and the coils B, b, B' and b'. In addition, the screen grid permits operation of the valve $a$ at a higher frequency than would otherwise be possible because its use eliminates or minimizes the tendency of the inherent control grid to anode capacitance to maintain oscillations regardless of the position of the vane C. Oscillation of the valve $a$ at such higher frequency is desirable because a given change in mutual inductance between the control coils B, b, B', and b' then produces a greater change in the amplitude of oscillation. In consequence, the screen grid contributes to the sharpness or sensitivity of the response of the valve $a$ to movement of the vane in the range of its movement in which oscillation of the valve $a$ is initiated and interrupted.

As shown in Fig. 1, the valve $a$, which is energized by alternating current supply conductors 1 and 2, comprises a cathode 3 with beam plate extensions 3a, control grid 4, screen grid 5, plate or anode 6 and cathode heating filament 7. The terminals of the filament 7 are connected to the supply conductors 1 and 2 by conductors 8 and 9, respectively.

Figure 2:
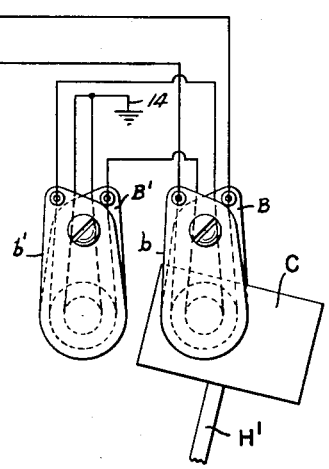
Fig. 2 is a diagrammatic view, taken at right angles to Fig. 1, of the control coils and vane of Fig. 1.

The diode a' comprises an anode or plate 31 connected to the supply conductor 2 by the conductor 9 and a cathode 30 connected to the supply conductor 1 by a condenser 52. The connected terminals of the cathode 30 and the condenser 52 are connected to the anode 6 of the valve a by a conductor 50, a portion of a conductor 18, a choke coil 10 and a portion of a conductor 11. As shown, the choke coil 10 is surrounded by a shield 10A. The cathode 3 of the valve a is connected to one terminal of a relay coil D. The second terminal of the coil D is connected to one terminal of a relay coil DA. The second terminal of the coil DA is connected by a conductor 100 to the supply conductor 2. The coils D and DA are shunted by condensers 32 and 33, respectively, and the coil DA is also shunted by a resistor 101. The inductance coils B and b are coaxial and are separated by a kerf-like space into and out of which the vane moves as the arm H' deflects. The inductance coils B' and b' are similarly coaxial and are latterly displaced from the coils B and b as shown in Figs. 1 and 2 and are spaced apart to provide an extension of the kerf-like space between the coils B and b. In its position shown in Figs. 1 and 2, the vane C is directly interposed between the coils B and b and reduces the mutual inductance of those coils. A deflection of the vane C to the right from its position shown in Figs. 1 and 2 will minimize or eliminate the effect of the vane C on the mutual inductance of the coils B and b. By a suitable deflection to the left from its position shown in Figs. 1 and 2, the vane C may be adjusted into a position in which it will minimize or eliminate the mutual inductance of the coils B' and b' as well as the mutual inductance of the coils B and b. In its position shown in Figs. 1 and 2, the vane C does not significantly affect the mutual inductance of the coils B' and b'.

As shown, one terminal of the coil B is connected to the anode 6 of the valve a by a condenser 13 and the previously mentioned conductor 11. The second terminal of the coil B is connected to one terminal of the coil B', and the second terminal of the coil B' is connected to ground by conductor 14. One terminal of the coil b is connected to the control grid of the valve a by a condenser 15 and a conductor 16. The second terminal of the coil b is connected to one terminal of the coil b' and the second terminal of the coil b' is connected to the ground connection 14. A high resistance 17 connects the connected terminals of the control grid 4 and condenser 15 to the connected terminals of the cathode 3 and the relay coil D. The last mentioned terminals are connected through a condenser 20 to ground at the point 21. The capacity of the condenser 20 is so chosen that in conjunction with the grounded conductors, the condenser forms a low impedance connection for high frequency current flow between the cathode of the valve a and the inductance coils B', b', B and b. A condenser 19 connects the connected terminals of the cathode 3 and relay coil D to the end of the choke coil 10 connected to the conductor 18. The latter connects the choke coil 10 and condenser 19 to the screen grid 5.

Ample voltage for energizing the series connected coils D and DA is insured, as is hereinafter explained, by connecting the diode anode 31 and grid valve cathode 3 to the supply conductor 2, and by connecting the diode cathode 30 and the anode 6 of the valve a to the supply conductor 1 as previously described. In the contemplated operation of the apparatus shown in Fig. 1, the current flow through the relay coils D and DA will be too small to energize either relay coil when the vane C is in its right hand or "low" position in which the vane does not significantly reduce the mutual inductance of either pair of control coils, and the valve a then oscillates with a relative high frequency. On movement of the vane C into its intermediate or "neutral" position in which it substantially minimizes or eliminates the mutual inductance of the coils B and b without significantly minimizing the mutual inductance of the coils B' and b', the amplitude of oscillation of the valve a is reduced and the current flow through the valve a and relays D and DA increases sufficiently to operatively energize the relay D but is still too low to operatively energize the less sensitive relay DA. When the relay D is thus energized its associated armature switch element D' is moved out of the position in which it connects the control terminals 23 and 25 and into the position in which it connects the terminals 24 and 23.

When the vane C moves to the left from its position shown in Fig. 1 into the position in which it substantially minimizes or eliminates the mutual inductance of the control coils B' and b' as well as of the coils B and b, the oscillation of the valve is interrupted and the current flow through the coils D and DA is so increased that the relay DA is operatively energized. In consequence, the armature switch element D² is then raised to disconnect the terminals 23' and 25' and to connect the terminals 24' and 23'. On a reverse movement of the vane from its left hand or "high" position into its "neutral" position shown in Fig. 1, the relay energizing current is sufficiently reduced to deenergize the relay coil DA without deenergizing the coil D, and the armature D² then drops back into engagement with the terminal 25'. Movement of the vane C to the right of its position shown in Fig. 1 so deenergizes the coil D that the armature D' drops into engagement with the terminal 25.

Figure 3:
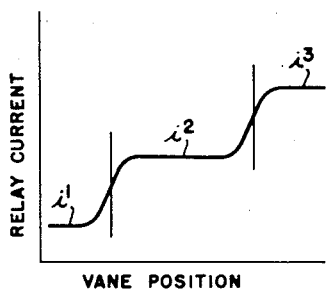
Fig. 3 is a diagram illustrating plate current variations produced in the operation of the apparatus shown in Fig. 1.

The variations in the relay current produced by the adjustment of the vane C of Fig. 1 into its three different positions as just described are illustrated diagrammatically in Fig. 3 wherein the horizontal curve sections i', i² and i³ represent the "low," "intermediate" and "high" values of the relay current maintained when the portion of the vane C is such that it respectively (1) does not significantly reduce the mutual inductance of either pair of control coils, (2) substantially eliminates the mutual inductance of one pair of control coils only, and (3) substantially eliminates the mutual inductance of both pairs of control coils. The inclined curved portions connecting the portions i', i² and connecting the portions i² and i³ illustrate the relatively abrupt character of the current variations produced as the vane moves in either direction into or out of its intermediate position. As will be apparent, the length of the intermediate portion of the curve may be increased or decreased by varying the displacement of the coils B' and b' from the coils B and b. This means of course that the positions of the two sets of control coils should be determined with proper regard to the contemplated range of movement given the vane C.

The armature switches D' and D² and associated terminals 23, 24, 25, 23', 24' and 25' may be associated with control apparatus of a known type to supply heating current or fuel to a furnace at one rate when both of coils D and DA are deenergized, at a second rate when the coil D is energized and coil DA is deenergized, and at a third rate when the coils D and DA are both energized. In many cases the supply of heating current or fuel may be entirely cut off when the vane is in its "high" position. As will be readily understood, the apparatus shown in Fig. 1 may be used to provide three-position control for other purposes than furnace regulation.

Figure 4:
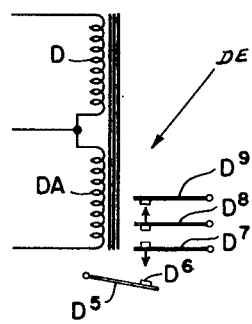
Fig. 4 is a diagram showing a modification of the electromagnetic switch arrangement shown in Fig. 1.

With a control system of the type shown in Fig. 1, the two separate relay units may be replaced by a single relay DE in which the coils D and DA are rigidly connected end to end in an instrument relay structure of a type and form illustrated and described in my parent application Serial No. 541,575. In the relay DE, the coils D and DA of Fig. 1 act additively on a common armature D⁵ associated with control contacts as shown diagrammatically in Fig. 4. In Fig. 4 three spring contact fingers D⁷, D⁸ and D⁹ are arranged side by side but out of contact with one another when the armature D⁵ is in its idle position shown in Fig. 4. When actuated, the armature D⁵ turns counter-clockwise and moves its contact D⁶ into engagement with the contact finger D⁷. When used in the control system shown in Fig. 1, the armature D⁵ of Fig. 4 may be actuated by a force which is just sufficient to move contact D⁶ into engagement with the contact arm D⁷ when the vane C is in its "low" position, which is sufficient to move the contact arm D⁷ into engagement with the contact arm D⁸ when the vane C occupies its "neutral" position, and which is sufficient to move the contact D⁸ into engagement with the contact D⁹ when the vane C moves into its "high" position. Contact member adjustments which are the reverse of those just described will be produced by movement of the vane C from its "high" position into its "low" position.

The small current normally flowing in the windings when the vane is in its "low" position moves the contact member D⁶ into engagement with the contact D⁷ and thereby enables the control apparatus to effect the appropriate low control action. The contact D⁶ thus serves to prevent unsafe operation as a result of tube failure or other accidental interruption of all current flow through the winding of the relay unit DE. The control circuit conductors associated with the contacts D⁶, D⁷, D⁸ and D⁹, to effect appropriate low, neutral and high control actions according to the position of the vane C, may be arranged in any of various suitable ways as those skilled in the art will understand.

With the cathode 3 of valve a and anode 31 of valve a' connected to the supply conductor 2 and with the anode 6 of valve a and cathode 30 of the valve a' connected to the supply conductor 1 through the condenser 52 as shown in Fig. 1, the effective energizing voltage impressed on the series connected relay coils D and DA is approximately double the line, or supply, voltage between conductors 1 and 2. During periods in which the valve a is not oscillating and the coils D and DA may be effectively energized, the condenser 52 is discharged by the valve a during the half cycles which alternate with half cycles in which the condenser is charged by the valve a'. During each half cycle in which the valve a' is conductive and is building up a charge on the condenser 52, the valve a is not conductive and does not interfere with the condenser charging operation. In consequence, the effective voltage impressed on the series connected relay coils D and DA in the following half cycle in which valve a is conductive is the sum of the voltage between the supply conductors 1 and 2 and the approximately equal condenser potential.

When the valve a is oscillating it is not operative to effectively discharge the condenser 52, and after the condenser is fully charged by the diode valve a', the latter ceases to pass any significant amount of current since the potential of the condenser 52 is then approximately as high as the opposing line voltage during the half cycles in which the diode can conduct current. The current flow through the relay coils due to the sixty cycle unidirectional voltage pulses impressed on them is smoothed out by the associated condensers 32 and 33 so that the relays operate substantially as they would if they were energized with continuous unidirectional current. The general combination of a condenser, diode, grid valve and load device, as shown in Fig. 1, is not claimed herein but is claimed in my copending application Serial No. 541,576, filed June 22, 1944, which issued as Patent No. 2,514,918 on July 11, 1950.

In Fig. 5, I have illustrated an arrangement in which two electronic tubes A and A¹⁰ and three electromagnetic relays, D¹⁰, D¹¹ and D¹² are employed to effect three-position control in response to variations in the mutual inductance of a single pair of control coils B and b. The winding of the relay D¹⁰ is connected in series with the filament elements of the tubes A and A¹⁰ and a conductor 104 between the branch conductor 8 from the supply conductor 1 and a branch conductor 105 from the supply conductor 2.

In Fig. 5, the valve a of the tube A and control coils B and b are associated by circuit provisions similar to those shown in Fig. 1, except that in Fig. 5 the choke coil 10 is connected to the screen grid 5 by a variable resistance 117. The winding of the relay D¹¹ is connected between the choke coil 10 and the conductor 2. In Fig. 5, the cathode 30 is directly connected to the supply conductor 1, and the plate 31 of the diode is connected by a conductor 106 and a resistance 107 to one terminal of a potentiometer resistance 108. The latter has its second terminal connected to the supply conductor 2 through the conductor 34 which is connected to one terminal of the relay D¹¹.

The valve A¹⁰ may be a beam power amplifier tube of the 35L6–GT form, comprising cathode, control grid, screen grid and plate elements 3, 4, 5 and 6, respectively, similar to those of the valve a included in the tube A. The cathode 3 of the tube A¹⁰ is connected to the resistance 108 at an adjustable intermediate point through an adjustable contact 109. The plate 6 of the tube A¹⁰ is connected to the screen grid 5 of the tube and is connected by a conductor 110 to one terminal of the relay D¹². The second terminal of that relay is connected to the previously mentioned conductor 104. The control grid 4 of the tube A¹⁰ is connected through a sliding contact 111 to an intermediate point along the length of a potentiometer resistance 112. The latter is connected in parallel with the winding of the relay D¹¹ and the by-pass condenser 113 which connects the terminals of that relay.

The terminals of the resistance 107 are connected by filter condensers 114 and 115 to the conductor 34 and thereby to the supply conductor 2. The condensers 114 and 115 may each have a capacitance of about 8 mfd. The capacitance of the condenser 113, and of the bypass condenser 116 connecting the terminals of the relay $D^{12}$, may be about 2 mfd. As shown, the screen grid 5 of the tube A is connected to the choke coil 10 through the variable resistance 117, which may have a value of the order of one-quarter of a megohm. The resistances 107, 108 and 112 may well be about 1,000 ohms, 200 ohms and 50,000 ohms, respectively. The resistance and capacitance values just stated are given by way of illustration and example and are not critical. It is practically desirable, however, that the resistance 108 should be low, as this prevents the tube $A^{10}$ from being appreciably self biased. By the adjustment of the amount of the resistance 117 in circuit, it is possible to vary the upper limit of the neutral range of variation in value of the controlling quantity which by its variations varies the position of the vane C relative to the coils B and b.

As shown, the energization of the relay $D^{10}$ adjusts a movable contact $D^{13}$ into engagement with a stationary front contact. The energization of the relay $D^{11}$ moves contacts $D^{14}$ and $D^{15}$ out of engagement with stationary back contacts and moves a contact $D^{16}$ into engagement with a corresponding stationary front contact. The energization of the relay $D^{12}$ moves contacts $D^{17}$ and $D^{18}$ out of engagement with associated stationary back contacts and moves contact $D^{19}$ into engagement with a stationary front contact.

In the contemplated operation of the control system shown in Fig. 5 the energization of the filament circuit of the tubes A and $A^{10}$ energizes the relay $D^{10}$ and thereby connects the relay contact $D^{13}$ to an energizing current terminal EC. The latter is then connected through the contact $D^{13}$ and one or more other relay contacts to "high," "neutral" or "low" control conductor terminals EH, EN and EL, respectively, depending upon the position of the vane C relative to the control coils B and b. Thus when the vane C is displaced to the left out of operative relation to the coils B and b as a result of the "low" value of the controlling quantity or condition, the valve a in the tube A oscillates and its space current has its minimum value. In consequence, the potential then impressed through the resistance 112 and contact 111 on the control grid 4 of the tube $A^{10}$ permits the potential across the resistance 108 to give the control grid of the tube $A^{10}$ a positive bias. In consequence, the current flow then maintained through the tube $A^{10}$ is large enough to energize the relay $D^{12}$ and the latter operates to connect the conductor EC through the relay contacts $D^{13}$, $D^{19}$ and $D^{15}$ to the "low" control conductor terminal EL.

As the value of the controlling quantity or condition increases and moves the vane C into position to reduce the mutual inductance of the coils B and b, the oscillation of the valve a in the tube A decreases. The resultant increase in the space current of that valve eliminates the positive bias on the control grid 4 of the tube $A^{10}$ and thereby deenergizes the relay $D^{12}$. On the deenergization of the relay $D^{12}$ the energizing terminal EC is connected through the relay contacts $D^{13}$, $D^{14}$ and $D^{17}$ to the neutral control terminal EN.

On a further increase in the value of the control quantity or condition and the resultant movement of the vane C and reduction in the mutual inductance of the coils B and b, the oscillation of the valve a of the tube A is further reduced and the space current of that valve is further increased to the value required to energize the relay $D^{11}$. The energization of the relay $D^{11}$ operates to connect the energizing terminal EC to the "high" control terminal EH through the relay contacts $D^{13}$, $D^{16}$ and $D^{18}$.

With the arrangement shown in Fig. 5, the value of the controlling quantity or condition at the low value end of its neutral range may be increased or decreased by adjusting the contact 109 to the left or to the right, respectively, along the resistance 108, so as to increase or decrease the value of the plate current of the valve $A^{10}$ maintained at a given value of the plate current of the valve a of the tube A. In general, the adjustment of the contact 109 should be accompanied by a corresponding adjustment in the same direction of the contact 111 along the resistance 112. The use of the potentiometer resistances 108 and 112 connected in bridging relation to the supply conductors minimizes the effect of variations in the supply voltage on the control actions effected. As previously stated, when the adjustable resistance 117 is employed as shown in Fig. 5, it serves by its adjustment to vary the value of the controlling quantity or condition at the upper end of the neutral range of that value.

Fig. 6 illustrates a modification of the three-position control system of Fig. 5. I now deem this modification preferable to the arrangement of Fig. 5 because its use makes possible a substantial reduction in the number of circuit components which is required.

The three position control system of Fig. 6 includes two electronic tubes $A^{10}$ and $A^{100}$, both of which may be of the beam power amplifier type such as the 35L6-GT tube, and two electromagnetic relays D and DA. Relay D is connected in the output circuit of the tube $A^{10}$ and relay DA is connected in the output circuit of the tube $A^{100}$. The output circuits of tubes $A^{10}$ and $A^{100}$ are connected in inverse manner to the alternating current supply conductors 1 and 2 so that tube $A^{10}$ is conductive during half cycles alternating with those during which tube $A^{100}$ is conductive. As is explained hereafter, the conductivity of tube $A^{100}$ is controlled in accordance with that of tube $A^{10}$.

In Fig. 6, the tube $A^{10}$ is associated with the two control coils B and b in such manner that the oscillation of tube $A^{10}$ is initiated and/or interrupted by movement of the vane C out of or into the position in which it is directly interposed between the coils B and b. The output circuit of tube $A^{10}$ may be traced from the supply conductor 1 to the cathode 3, the anode 6, a choke coil 10 shunted by a resistance 57 and the winding of relay D to the supply conductors 2. When tube $A^{10}$ is oscillating its conductivity is too small to permit flow in the said output circuit of sufficient plate current to energize relay D. When the oscillation is interrupted sufficient plate current to energize relay D flows in the output circuit.

As noted above, the conductivity of the tube $A^{100}$ is controlled in accordance with the conductivity of the tube $A^{10}$. This result is produced by impressing on the input circuit of tube $A^{100}$ a voltage produced by the flow of plate current through the winding of relay D. To this end the cathode 3 of tube $A^{100}$ is connected to one end of the winding of relay D and the control electrode 4 is connected to the other end in such manner that the flow of current through the said winding produces a negative potential on the control electrode 4. This potential is held over to the half cycle during which the tube $A^{100}$ is conductive by the condenser 113. The magnitude of this potential varies in accordance with the plate current flow through the winding of relay D, and therefore, in accordance with the condition of oscillation of tube $A^{10}$. Hence, the conductivity of tube $A^{100}$ is varied in accordance with the latter condition. The output circuit of tube $A^{100}$ may be traced from the supply conductor 1 through the winding of relay DA shunted by condenser 116 to the plate 6 and the cathode 3 of tube $A^{100}$ to the supply conductor 2.

According to the contemplated operation of the control system of Fig. 6, insufficient plate current flows through tube $A^{10}$ to energize relay D when the vane C is out of the position between coils B and $b$ and tube $A^{10}$ is oscillating. Such small value of plate current as then flows through the winding of relay D is effective to produce only a small negative potential on the control electrode of tube $A^{100}$, and consequently, the latter is then fully conductive and relay DA is energized. Under this condition the armature D' of relay D will be in engagement with its back contact, shown as the lower contact, and the armature of relay DA will be in engagement with its front or upper contact. As the vane C deflects into an intermediate position between the coils B and $b$, the magnitude of oscillation of tube $A^{10}$ decreases and its plate current increases sufficiently to produce a potential drop across the winding of relay D of the required magnitude to effect deenergization of relay DA by decreasing the conductivity of tube $A^{100}$, but not enough to energize relay D. The armatures of both relays will then be in engagement with their lower contacts. Upon further deflection of vane C toward the position directly between the coils B and $b$, the plate current of tube $A^{10}$ increases to a value sufficient to energize relay D. Such additional increase in plate current produces no change in the operative condition of relay DA, and hence, the armature $D^2$ of relay DA will then remain in its lower position while the armature of relay D is adjusted to its upper position.

In Fig. 6, the terminals of the coils B and $b$ respectively connected to the condensers 13 and 15 are connected by a resistor 53 which is employed to insure substantially complete stability of the oscillator system and to prevent positively the valve $A^{10}$ from oscillating when the vane C is in position to reduce the mutual inductance of the control coils to a minimum. I have experimentally determined that the sensitivity of the response of a control system including a resistor 53 arranged in the manner shown in Fig. 6 to movement of the vane C is not effected by the use of the resistor 53, if the resistance of the latter is above 10,000 ohms. While the use of the resistor 53 in the control apparatus shown in Fig. 6 is not imperative, it is advantageous and has the practical advantage of increasing the permissible mechanical tolerances in respect to the spacing of the two control coils B and $b$ relative to one another and to the cooperating vane C. The stabilizing effect of the resistance 53 is attributable in large part at least to the fact that it minimizes the effect of the capacitance of the conductor connections to the control coils B and $b$.

The control apparatus shown diagrammatically in Figs. 1, 5 and 6 is characterized by its inherent simplicity, reliability and capacity for operation with high sensitivity. By way of example, and not by way of limitation, it is noted that in one practical embodiment of the control apparatus illustrated in Figs. 1, 5 and 6, the capacitances of the condensers 13 and 15 are 0.00005 and 0.00007 mfd., respectively; and the capacitance of each of the condensers 19 and 20 is 0.0001 mfd., though the capacitance value of neither is critical. The capacitances of the condensers 13 and 15 with the capacitance of the oscillator valve and the distributed capacitances of the circuit elements provide the capacitance in the series resonant circuit portions of the system. The condensers 13 and 15 also serve as blocking condensers preventing risk of injurious current flow through coils B and $b$, due to the normal 60 cycle, 110–120 volt potential between the supply conductors 1 and 2. The condensers 19 and 20 serve as by-pass condensers and their respective capacitances are not critical, as noted above.

Novel features of the apparatus disclosed, but not claimed, herein are claimed in my said application Serial No. 541,575 and in the divisions thereof, Serial No. 607,034 filed July 25, 1945, now Patent No. 2,511,608 of June 13, 1950, and Serial No. 634,599 filed December 12, 1945, now Patent No. 2,511,819 of June 13, 1950.

While, in accordance with the provisions of the statutes, I have illustrated and described the best forms of my invention now known to me, it will be apparent to those skilled in the art that changes in the form of the embodiments of my invention illustrated and described herein may be made without departing from the spirit of the invention as set forth in the appended claims. It will be understood also that use may sometimes be advantageously made of some features of my invention without a corresponding use of other features.

Having now described my invention, what I claim as new and desire to secure by Letters Patent, is:

1. Control apparatus comprising a control device including an electronic valve having an input electrode included in an input circuit, an output electrode included in an output circuit, and a common electrode common to both of said circuits, a load circuit including said output electrode, an impedance device connected in a feedback circuit between said input and output circuits to form an oscillator circuit, said feedback circuit being operative to feed back electrical energy from said output circuit to said input circuit under the control of said impedance device, adjustable means operable to vary the impedance of said impedance device between first, second, and third values at which said feedback circuit is operative to cause oscillation of said oscillator circuit at maximum, intermediate, and minimum amplitudes, respectively, and a bias impedance included in said input circuit and operative to vary the conductivity of said load circuit in accordance with the amplitude of oscillation of said oscillator circuit and hence in accordance with the adjustment of said impedance device, a relay device having a first operating portion, a second operating portion, and contact means jointly controlled by said operating portions and having first, second, and third operating positions, the position assumed by said contact means being dependent upon the selective operative energization of said operating portions, a pair of supply terminals adapted to be connected to a source of energizing current, and connecting means connecting said operating portions to said load circuit between said supply terminals for the selective operative energization of said operating portions in accordance with the conductivity of said load circuit, whereby said contact means is operative to assume said first, second, or third position accordingly as said oscillator circuit oscillates at said maximum, intermediate, or minimum amplitude, respectively.

2. Apparatus as specified in claim 1, wherein said contact means includes safe-failure contact elements, wherein said relay device is operative to actuate said contact elements upon the failure of the source of current to energize the apparatus, wherein said contact means has a fourth operating position, and wherein the actuation of said contact elements upon the occurrence of said failure is operative to cause said contact means to assume said fourth position.

3. Apparatus as specified in claim 1, wherein each of said operating portions is a respective relay winding, wherein said connecting means includes conductors connecting said relay windings and said load circuit in series between said terminals, wherein said contact means is operative to assume said first, second, or third operating position, respectively, accordingly as neither, only one, or both of said windings is operatively energized, wherein said one of said windings is operative to be operatively energized by a value of the conductivity of said load circuit which is insufficient to effect the operative energization of the other of said windings, the last mentioned value being that corresponding to oscillation of said oscillator circuit at said intermediate amplitude, and wherein the value of the conductivity of said load circuit corresponding to said maximum amplitude of oscillation is insufficient to effect the operative energization of either of said windings while the value of the conductivity of said load circuit corresponding to said minimum amplitude of oscillation is sufficient to effect the operative energization of both of said windings.

4. Apparatus as specified in claim 3, wherein said contact means includes a first switch associated exclusively with said one relay winding and includes a second switch associated exclusively with said other relay winding, wherein said first switch is operative to establish only a first connection when said one winding is not operatively energized and to establish only a second connection when said one winding is operatively energized, wherein said second switch is operative to establish only a third connection when said other winding is not operatively energized and to establish only a fourth connection when said other winding is operatively energized, and wherein the simultaneous establishment of said first and third connections, said second and third connections, and said second and fourth connections constitutes said first, second, and third operating positions of said contact means, respectively.

5. Apparatus as specified in claim 3, wherein said relay device is a single relay including said two relay windings, wherein said contact means includes a switch operative to establish only a first connection when neither of said windings is operatively energized, operative to establish said first and a second connection simultaneously when only said one winding is operatively energized, and operative to establish said first, said second, and a third connection simultaneously when both of said windings are operatively energized, and wherein the establishment of said first connection, the simultaneous establishment of said first and second connections, and the simultaneous establishment of said first, second, and third connections constitutes said first, second, and third operating positions of said contact means, respectively.

6. Apparatus as specified in claim 5, wherein said contact means has a fourth operating position, wherein said fourth position comprises the interruption of said first connection, and wherein said relay device is operative to cause said switch to interrupt said first connection upon failure of the source of current to energize the apparatus.

7. Apparatus as specified in claim 1, wherein each of said operating portions is a respective relay winding, wherein said connecting means includes a second electronic valve having a control electrode included in a control circuit, having an output electrode included in a second load circuit, and having a common electrode common to said control and said second load circuits, conductors connecting one of said windings and the first mentioned load circuit in series between said terminals, conductors connecting said control circuit across said one winding and operation to cause an increase in the conductivity of said first load circuit to effect a corresponding decrease in the conductivity of said second load circuit, and conductors connecting the other of said windings and said second load circuit in series between said terminals, wherein said contact means is operative to assume said first, second, or third operating position, respectively, accordingly as only said other, neither, or only said one of said windings is operatively energized, wherein the value of the conductivity of said first mentioned load circuit corresponding to said maximum amplitude of oscillation is insufficient to effect the operative energization of said one winding and is insufficient to decrease the conductivity of said second load circuit and prevent the operative energization of said other winding, and wherein the value of the conductivity of said first mentioned load circuit corresponding to said intermediate amplitude of oscillation is insufficient to effect the operative energization of said one winding but is sufficient to decrease the conductivity of said second load circuit and prevent the operative energization of said other winding while the value of the conductivity of said first mentioned load circuit corresponding to said minimum amplitude of oscillation is sufficient to effect the operative energization of said one winding and to decrease the conductivity of said second load circuit and prevent the operative energization of said other winding.

8. Apparatus as specified in claim 7, wherein said contact means includes a first switch associated exclusively with said one relay winding and includes a second switch associated exclusively with said other relay winding, wherein said first switch is operative to establish only a first connection when said one winding is not operatively energized and to establish only a second connection when said one winding is operatively energized, wherein said second switch is operative to establish only a third connection when said other winding is not operatively energized and to establish only a fourth connection when said other winding is operatively energized, wherein the simultaneous establishment of said first and fourth connections, said first and third connections, and said second and third connections constitutes said first, second, and third operative positions of said contact means, respectively, and wherein the connection of said control circuit across said one winding includes a source of potential tending to increase the conductivity of said second load circuit.

9. Apparatus as specified in claim 7, wherein said contact means includes a first switch associated exclusively with said one relay winding and includes a second switch associated exclusively with said other relay winding, wherein said first switch is operative to establish only a first connection when said one winding is not operatively energized and to establish only a second connection when said winding is operatively energized, wherein said second switch is operative to establish only a third connection when said other winding is not operatively energized and to establish only a fourth connection when said other winding is operatively energized, wherein the simultaneous establishment of said first and fourth connections, said first and third connections, and said second and third connections constitutes said first, second, and third operating positions of said contact means, respectively, and wherein said control circuit is connected directly across said one winding and is affected solely by the potential drop across said one winding.

WILLIAM H. WANNAMAKER, Jr.

REFERENCES CITED

The following references are of record in the file of this patent:

UNITED STATES PATENTS

| Number | Name | Date |
|---|---|---|
| Re. 14,394 | Hall | Nov. 13, 1917 |
| 1,112,784 | Gale | Oct. 6, 1914 |
| 1,252,060 | Tirrill | Jan. 1, 1918 |
| 1,944,988 | Lum | Jan. 30, 1934 |
| 2,154,260 | Brandenburger | Apr. 11, 1939 |
| 2,234,184 | MacLaren | Mar. 11, 1941 |
| 2,238,040 | Dickens | Apr. 15, 1941 |
| 2,411,247 | Cohen | Nov. 19, 1946 |
| 2,467,901 | McArthur | Apr. 19, 1949 |
| 2,496,975 | Bach | Feb. 7, 1950 |
| 2,497,404 | Gieringer | Feb. 14, 1950 |